United States Patent
Mothes (10) Patent No.: US 6,659,609 B2
(45) Date of Patent: Dec. 9, 2003

(54) DEVICE FOR DETERMINING SPECTACLE LENS CENTERING DATA

(76) Inventor: Frank Mothes, Forststrasse 49a, 85521, Ottobrunn-Riemerling (DE)

(*) Notice: Subject to any disclaimer, the term of this patent is extended or adjusted under 35 U.S.C. 154(b) by 0 days.

(21) Appl. No.: 10/169,378
(22) PCT Filed: Apr. 26, 2001
(86) PCT No.: PCT/EP01/04745
§ 371 (c)(1),
(2), (4) Date: Sep. 26, 2002
(87) PCT Pub. No.: WO01/84222
PCT Pub. Date: Nov. 8, 2001

(65) Prior Publication Data
US 2003/0098953 A1 May 29, 2003

(30) Foreign Application Priority Data
Apr. 27, 2000 (DE) .......................... 100 20 697

(51) Int. Cl.[7] ................................. A61B 3/10
(52) U.S. Cl. ................................. 351/204
(58) Field of Search .................. 351/204, 208, 351/209, 222, 223, 227, 177, 178; 345/660, 619, 629, 630; 382/117; 396/18

(56) References Cited

U.S. PATENT DOCUMENTS 6,508,553 B2 * 1/2003 Gao et al. ............... 351/227
6,583,792 B1 * 6/2003 Agnew .................... 345/660

* cited by examiner

Primary Examiner—George Manuel
(74) Attorney, Agent, or Firm—Antonelli, Terry, Stout, Kraus, LLP (57) ABSTRACT

The invention relates to a device for determining spectacle lens centering data, comprising a housing (18) that is height-adjustable by means of a lifting column (10), said housing having a digital video camera, whose lens (20) are mounted together with a mirror (22) and a light source (24) in the area of the front surface (26) of the housing (18). Said device also has a digital computer (32) that is connected to the digital video camera, wherein the customer (40) can take position in a marked place (42), preferably at a distance of approximately 3 m, and an attachable clip (50) equipped with a sighting device (66) can be attached to the frame of the spectacles (41), whereby the required centering data can be quickly and precisely determined by means of a substantially automated computer program.

8 Claims, 8 Drawing Sheets

DEVICE FOR DETERMINING SPECTACLE LENS CENTERING DATA

BACKGROUND OF THE INVENTION

1. Field of the Invention

The present invention relates to a device for determining the centering data for eyeglass lenses, i.e., to adjust optical lenses to the parameters of a specific eyeglass frame.

2. Description of the Prior Art

Among the various parameters which must be adjusted to fit the eyeglass lenses correctly in the eyeglass frame and to make the optical centers of the lenses coincide with the visual axes of the eyes, it is usual to know the pupillary distance and the level of the pupils with respect to the eyeglass frame.

It is also important to measure the level of the optical centers of the lenses with respect to the lower and upper edges of the eyeglass frame into which they are to be fitted.

The usual routine procedure employed by the optician—and thus the currently accepted prior art—is one in which the optician and client sit opposite one another and the client puts on a frame of his choice containing a glass disk. The client is then requested to "look at a distant point," after which the optician draws a hatch mark, based on visual judgment, on the disk or a ruled contrast film at the viewing reference point which has been sighted from the visual reference opposite the client. The centering hatch mark determines the position of the optical center of the eyeglass lens to be set in the frame.

This procedure is followed individually for each eye (monocular approach)—with the result that one obtains, essentially empirically, the pupillary distance PD—including, however, all possible attendant imprecision from parallax, marking errors, etc.

SUMMARY OF THE INVENTION

The present invention is a device which allows for a rapid and practicably precise determination of the necessary eyeglass lens centering data.

According to the invention, this goal is achieved by a device for determining the eyeglass lens centering data, the device including a housing which is height-adjustable by means of a lift column, the housing supporting a digital video camera in which the objective lens together with a mirror and a light source is located in the region of the front panel of the housing; and including a digital computer connected to the digital video camera, wherein the client may take up a marked position, preferably one approximately 3 m distant, with the already-selected eyeglass frame in front of the mirror, and wherein a superposable frame is mountable on the eyeglass frame, the superposable frame being equipped with a sighting device with a scale from which the tilt of the eyeglasses is readable, the head position of the client and tilt of the eyeglasses being monitorable at the computer on the monitor screen, and wherein the superposable frame has two calibration points at a predetermined spacing which matches the average distance between the eyes, the exact position of the calibration points being quickly and precisely determinable by an essentially automated computer program on the monitor screen after freezing the client image by controlling the individual calibration points by a square box appearing automatically on the screen and subsequently automatically determining the brightness center point of the calibration points, the exact position of the two reflection points of the light source on the cornea imaged on the screen also being quickly and precisely determinable analogously in a subsequent program step by controlling the square box.

The device according to the invention is distinguished specifically by the fact that the determination of data by using the reflection points of the light source at the apex of the cornea of the right and left eye is effected very precisely. These reflection points are obtained as an essentially point-type reflected image of the light source at the apex of the cornea. The light source of the device according to the invention consists preferably of a ring illuminator which surrounds the edge of the mirror which is designed as a circular mirror. The above light source may also consist of two Illuminators which are located on each side of the mirror edge, approximately at the level of the objective lens of the video camera, or preferably approximately at a level immediately above the upper edge of this objective lens.

The sighting device of the superposable frame advantageously has an on-off-switchable locating illuminator, specifically in the form of a light-emitting diode, as well as a diffusing screen with a scale in front of which a preferably spherical bead of the sighting device is located at a predetermined distance of approximately 20 mm, wherein an essentially point-type shadow on the scale of the sighting device is created when the spherical bead is illuminated, the shadow being employed to read the tilt angle of the eyeglasses, and wherein a horizontal line of the scale, which line preferably matches the approximately 11° tilt angle of the eyeglasses and is emphasized in thickness as the reference line, and wherein the additional horizontal scale lines above and below this reference line each represent a change in the eyeglass tilt angle of approximately 5°. The locating illuminator on the superposable frame ensures that the client gazes at the reflected image of the illuminating locating illuminator in the mirror at a preferred measurement distance of 3 m between the client and mirror, and thus at a real distance of 6 m, thereby meeting the requirement of viewing with a relaxed focus; in addition, this measurement may be performed in the examination room or in ancillary rooms without interfering with general client traffic.

The rapidity of the measurement procedure is achieved by the fact that the computer is programmed so that the individual measurement steps proceed essentially automatically and upon completion of a given step the tools and aids required for the next step automatically appear on the monitor screen. The operator is thus guided through the measurement program, thereby accelerating the measurement procedure.

The main emphasis has been laid specifically upon the fast and practicably precise determination of the required centering data. An extremely important factor is the fact that operation is simple and may be performed by any employee after a brief training period. These requirements were able to be met by the device according to the invention which is not based on the previous method of measurement. The invention is based on utilizing the cornea reflection of a light source located at a distance of 3 meters. This reflection provides a precise reference point for determining the centering data, whereas the determination of the measurement data based on the edge of the iris provides only estimated values. In the device according to the invention, preferably a plurality of preferably approximately 10×10 to 20×20 pixels on the computer screen are selected when determining the brightness center point of the calibration points for the superposable frame and/or of the reflection points of the light source on the cornea of the eye using the square box, only those pixels of the square box being selected to determine the brightness center point for which the brightness lies above an externally selectable threshold, and the evaluation proceeding by way of a weighted averaging in which a first sum is obtained from the brightness of the selected pixels multiplied by the X-coordinate, a second sum from the brightness of the selected pixels multiplied by the Y-coordinate, and a third sum from the brightness of selected pixels, the X-coordinate of the brightness center point resulting from division of the first sum by the third sum, and the Y-coordinate of the brightness center point resulting from division of the second sum by the third sum.

BRIEF DESCRIPTION OF THE DRAWINGS

The following discussion utilizes an embodiment to explain the invention in greater detail based on schematic drawings.

DESCRIPTION OF THE PREFERRED EMBODIMENTS

To assemble the device according to the invention, the pedestal 14 is set up and screwed on to the fixed section 12 of the lift column; then the front panel 26 together with the mirror 22 is unscrewed from the housing 18 and the housing together with the camera mount and the light source 24 are screwed on to the movable section 16 of the lift column. The power cable (not shown) is then connected to pedestal 14, the computer cable (not shown) is plugged in to the provided socket, and the plug of the lift motor also plugged in. Finally, the digital video camera together with the objective lens 20 is carefully inserted in the camera mount and secured, and the video camera is connected to the camera cable. After securely screwing on front panel 26 which supports mirror 22, the system must be adjusted, i.e., the lift column 10 with mirror 22 must be adjusted in height until the center of the mirror has reached the zero-sighting axis 27 such that the head of the client is now at the center of the mirror as well as at the center of the monitor screen. If this is not the case, the image must be appropriately adjusted laterally and also vertically as required. The optical axis 28 of the objective lens 20 of the video camera, which may have a focal length of 60 mm or 70 mm, must intersect the zero-sighting axis 27 of the client in the region of the eyes of the client; the image sharpness and brightness may be adjusted at the camera.

Figure 1:
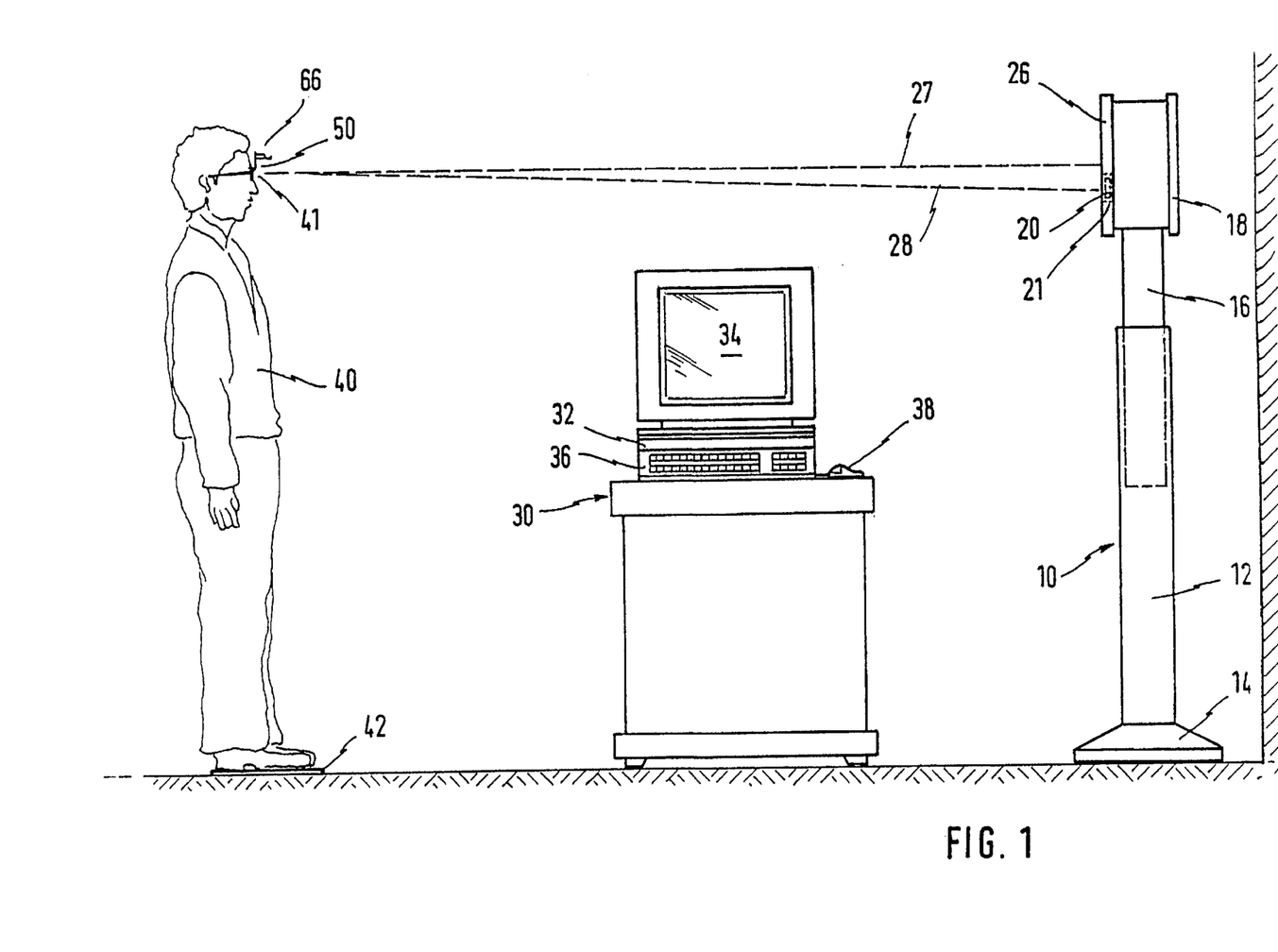
FIG. 1 is a side view of an embodiment of a measurement stand of a device according to the invention.
Figure 2:
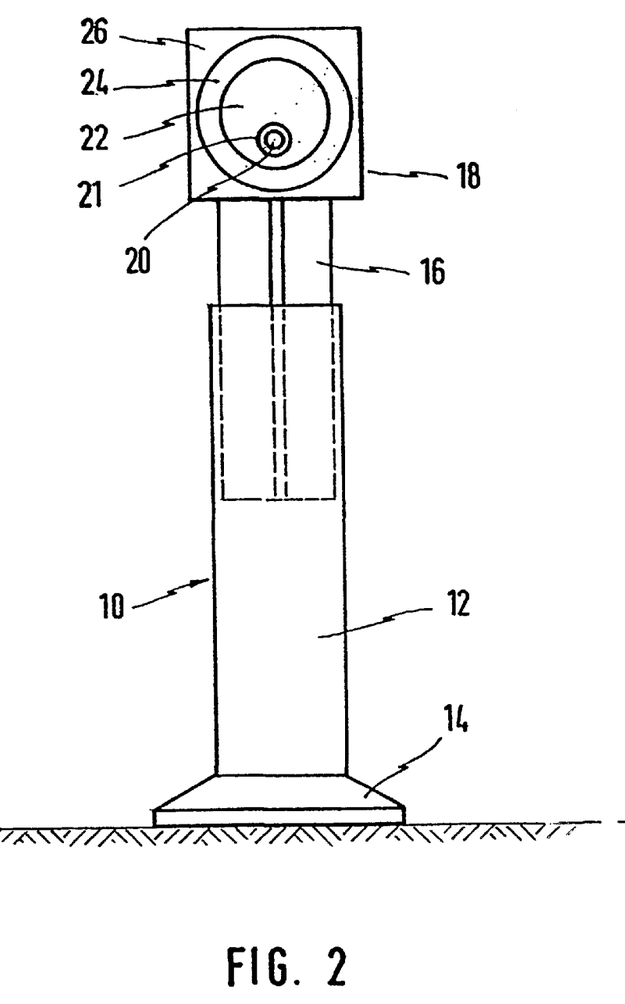
FIG. 2 is a front view of the lift column shown in a side view in FIG. 1.
Figure 3:
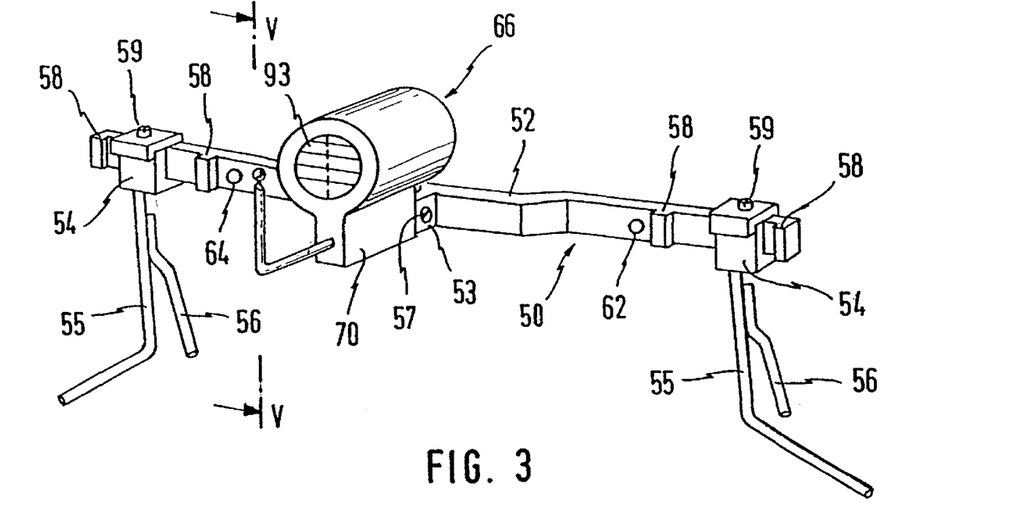
FIG. 3 is a perspective view of a superposable frame according to the invention.
Figure 4:
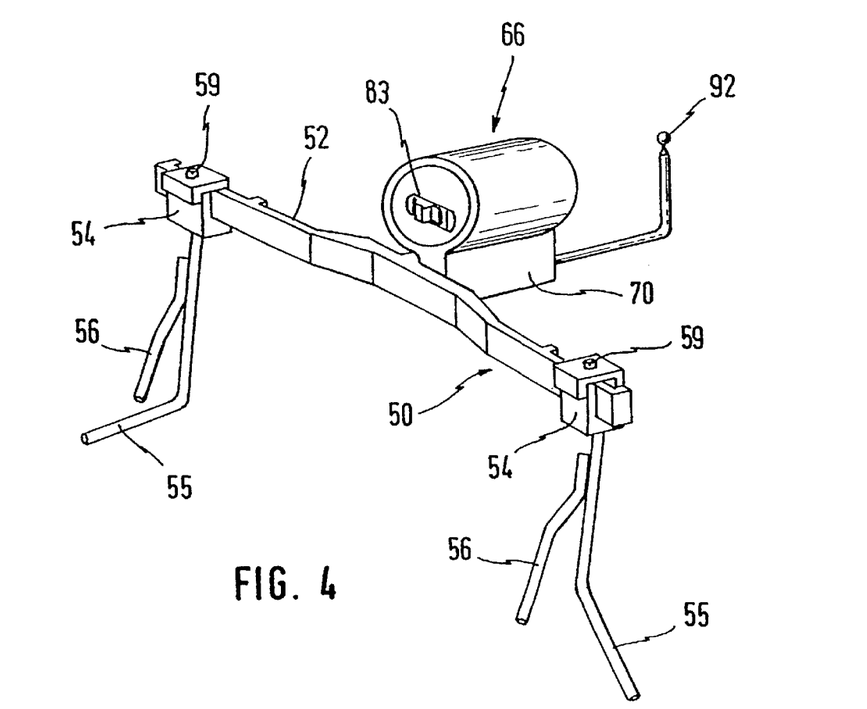
FIG. 4 is a perspective rear view of the superposable frame in FIG. 3.
Figure 5:
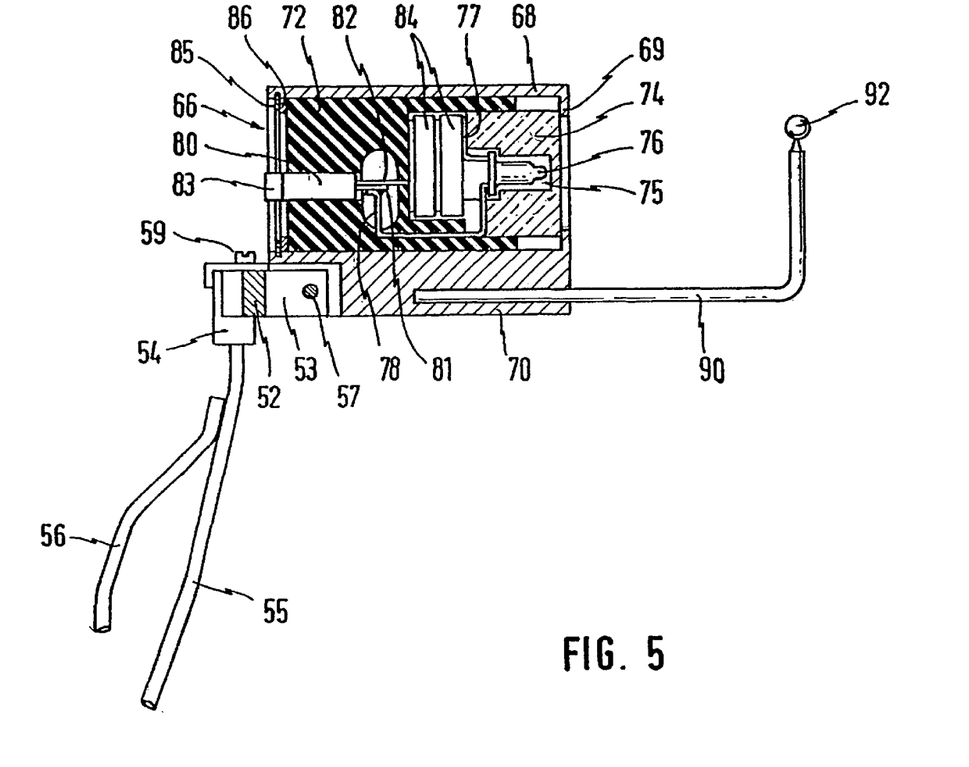
FIG. 5 is a vertical partial section along line V—V of FIG. 3 on an enlarged scale.
Figure 6:
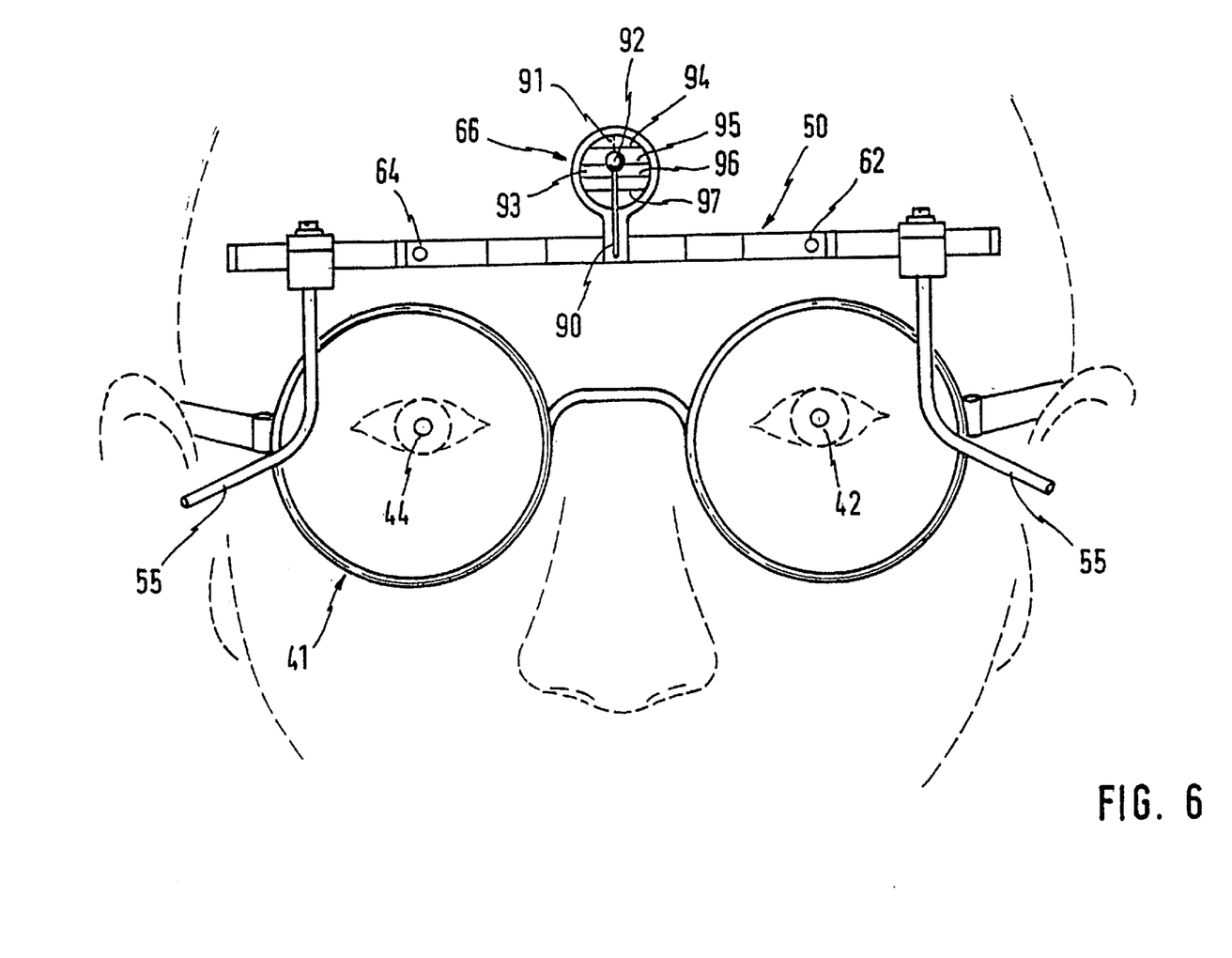
FIG. 6 is a computer image of a client with the superposable frame over the selected eyeglass frame after aligning the head.
Figure 7:
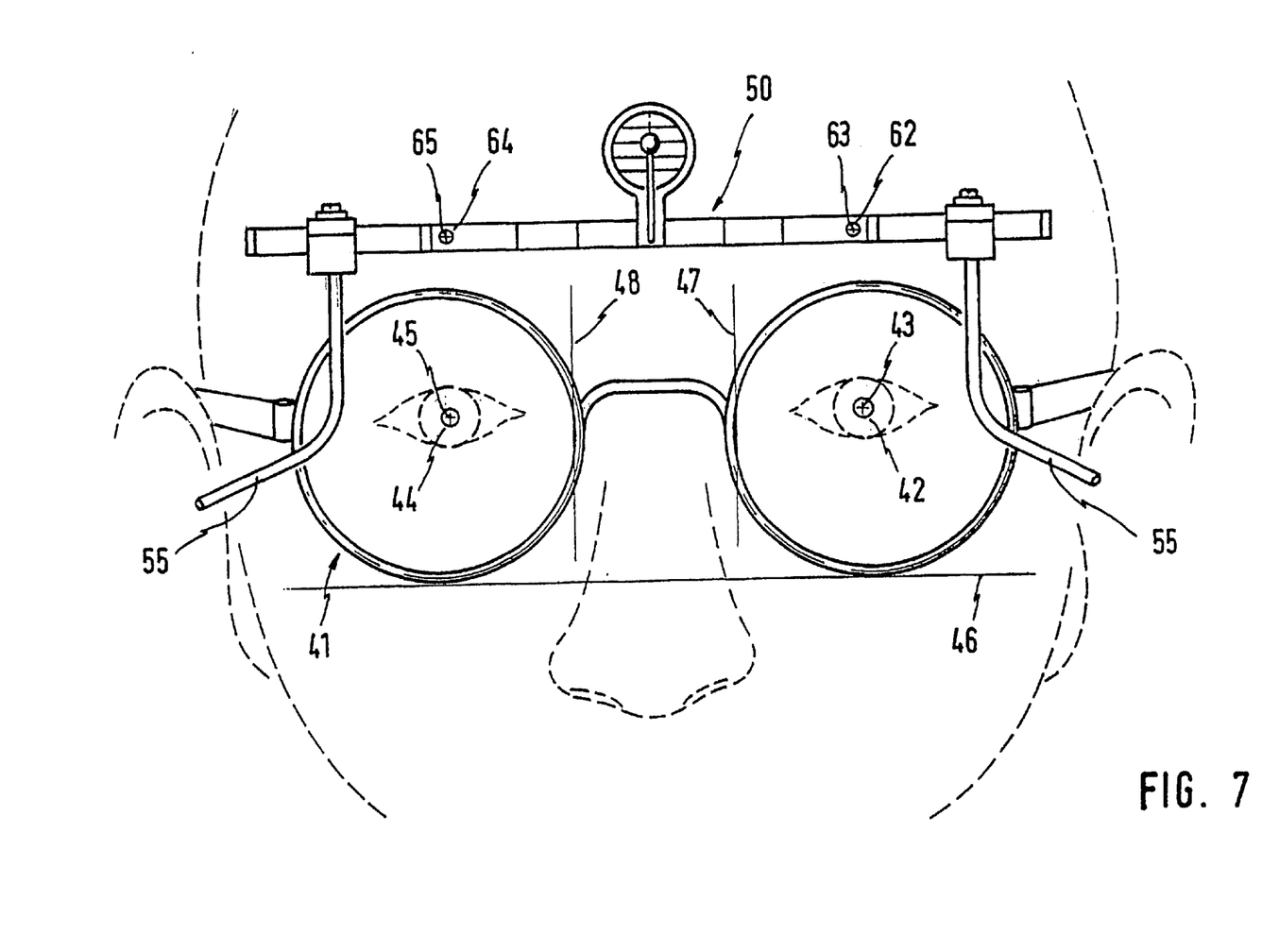
FIG. 7 is a view analogous to that of FIG. 6, after placing the measurement hatch marks, and positioning the horizontal measurement line at the lower edge of the frame and the two vertical measurement lines at the left and right inner edges of the frame.

After all the cables (not shown) of the device have been connected to the computer 32 and the main switch has been switched on, the image of the client 40 to be measured appears on monitor screen 34, the client preferably standing approximately 3 m away from mirror 22 of lift column 10 at a position 42 marked by metal feet (FIGS. 1 and 2). The superposable frame 50 is mounted on the already fitted eyeglasses 41 of the client 40, the superposable frame being equipped with a sighting device 66 fitted with a light emitting diode 76 serving as a locating illuminator (FIGS. 3 through 5). A switch 80 together with an actuation lever 83 and two button cells 44 are included in sighting device 66 of the superposable frame, the cells being integrated within an insulating component 72 which in turn is located in a generally hollow cylindrical component 68. A scale 93 is located on the front side of the light-emitting diode, from which scale the tilt of the eyeglasses may be read using horizontal lines 94, 95, 96, and 97. As the client tilts his head, spherical bead 92 of sighting device 66 drops and the tilt angle increases.

Computer station 30, specifically monitor screen 34, allows the correct head position of the client to be checked. Once the client is in position, centered approximately three meters in front of mirror 22, the mirror is raised or lowered by lift column 10 until the face of the client appears at the center of the monitor screen. The client should view locating illuminator 76 through mirror 22 in a relaxed manner. The locating line on the superposable frame is centered by the client's turning his head. This action ensures that the face is parallel to the mirror. The image is now "frozen" by clicking the "Freeze Image" button (FIG. 9), and the measurement can performed.

The image may now be processed at leisure while the client leaves and observes subsequent procedures. If the mouse cursor is now moved to the right into the frozen image, the cursor automatically changes to a square box. This square box is used to select, for example, 15×15 pixels of the screen which allow determination of the brightness center point of a calibration point 62 or 64 of superposable frame 50, or of the brightness center point of the light reflections 42 or 44 imaged on the screen from the cornea of the eyes. Within this square box, only those pixels are chosen for evaluation for which the brightness lies above an externally-selectable predetermined threshold. The evaluation is performed by "weighted" averaging. The following sums are generated from the three characteristics of the evaluated pixels:

1. brightness multiplied by X-coordinate
2. brightness multiplied by Y-coordinate
3. brightness.

Dividing sum 1 by sum 3 results in the X-coordinate of the brightness center point, and dividing sum 2 by sum 3 results in the Y-coordinate of the brightness center point.

The square box is positioned by the left calibration point (62) of the superposable frame 50, although the white point 62 does not necessarily need to be in the center of the box but only needs to be located within the box, the location being unimportant.

Pressing the left mouse button causes the program to automatically seek the center of the white point 62 and add a red measurement hatch mark 63. The operator then moves to the next calibration point 64 and repeats the process, causing the program to automatically add measurement hatch mark 65. The operator now moves to the white reflection point 42 in the left eye and then to reflection point 44 in the right eye to add measurement hatch marks 43 and

Figure 8:
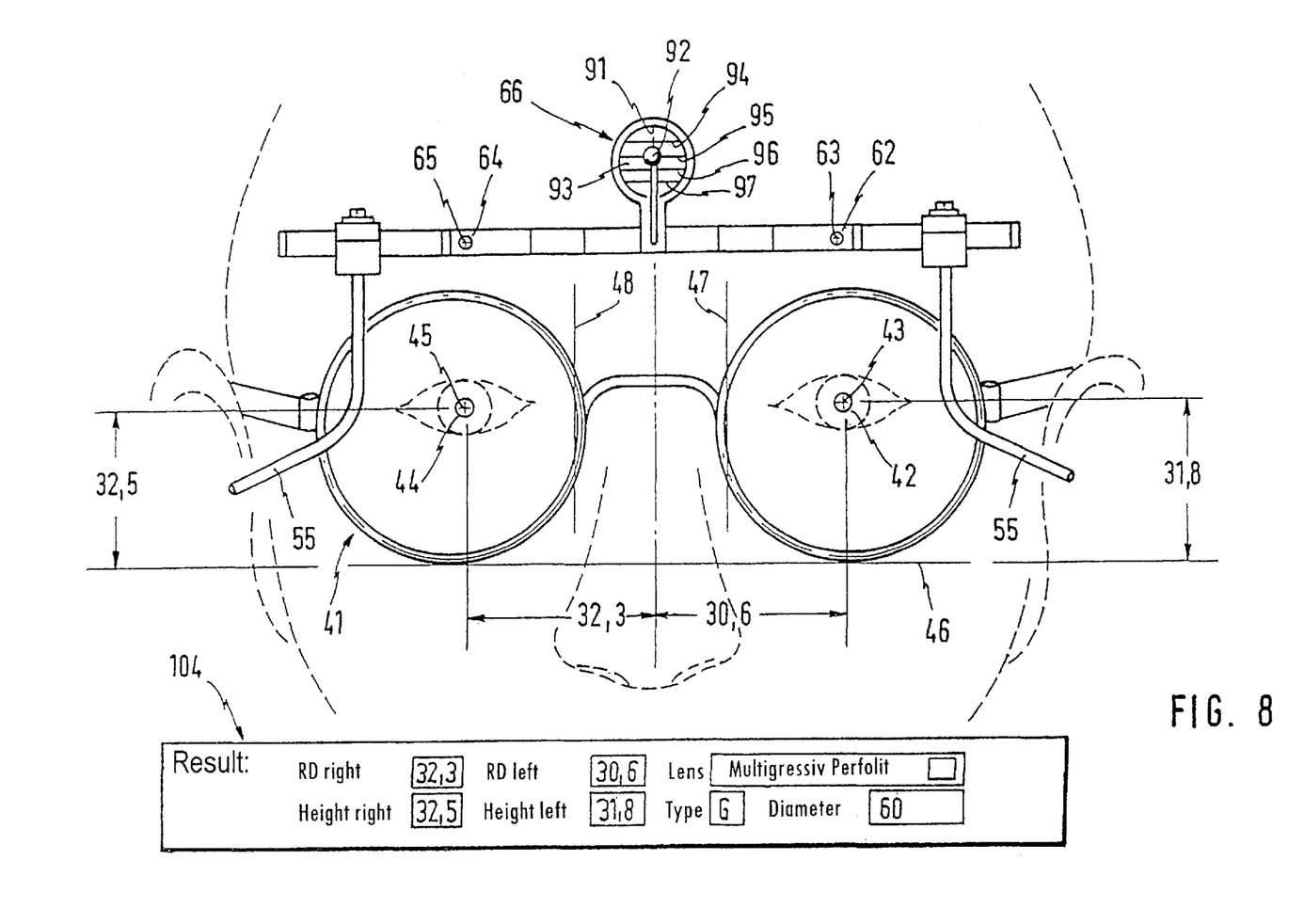
FIG. 8 is a view analogous to that of FIG. 7, but with additional subsidiary lines and the measurement result.

45. When the red measurement hatch mark 44 has been positioned in the right eye, a horizontal measurement line 46 automatically appears, and the mouse cursor changes into a hand. The operator then causes measurement line 46 to rest on the lower frame edges of eyeglasses 41 by moving the mouse up, down, left or right. The operator then clicks the left mouse button, and a vertical measurement line 47 appears which is positioned at the left inner frame edge. The operator then clicks the left mouse button and positions the second vertical measurement line 48 which appears at the right inner frame edge. Clicking the left mouse button completes the measurement procedure, and the measurement results appear at the bottom of the monitor screen, as shown with reference 104 in FIG. 8. The two center distances RD are indicated here for the right and left eye, as well as the vertical distances from the lower lens edge to measurement points 43 or 45, thus providing the required data to produce a precisely centered pair of eyeglasses.

Figure 9:
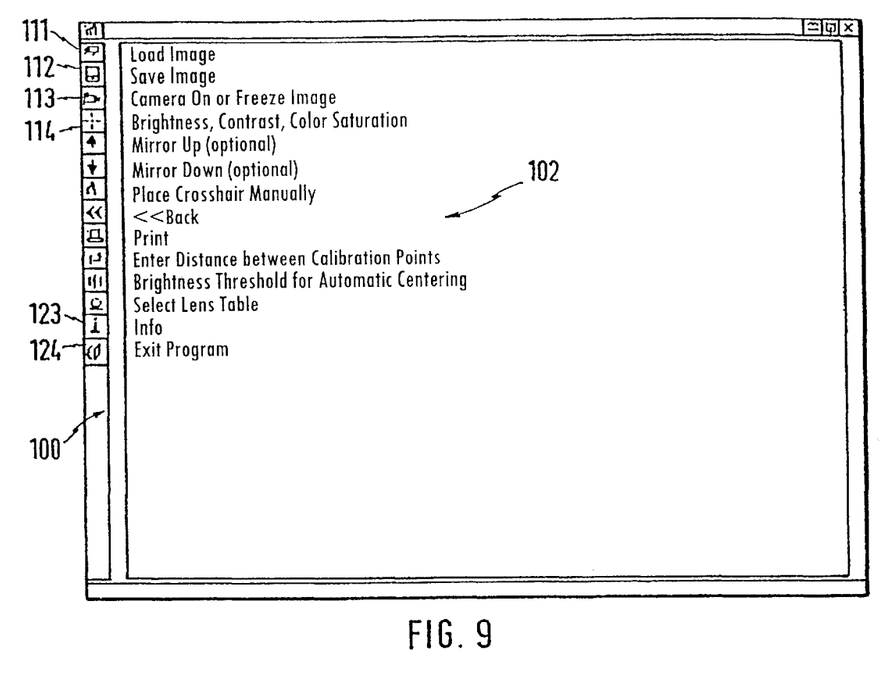
FIGS. 9 and 10 are a highly schematic view of the control panels or windows appearing on the monitor.

In the screen shot shown in FIG. 9, there is a bar 100 located at the left of the screen with buttons ill through 124 and associated explanations 102, which only appear, however, if a button is activated with the mouse cursor by positioning the mouse cursor over the button and clicking with the left mouse button.

Images saved earlier may be accessed by "Load Image" button Ill. Clicking this button produces the window shown in FIG. 10. The names of all previously saved images are listed. To facilitate orientation, clicking a name produces a preview of the image on the right side of the window.

Figure 10:
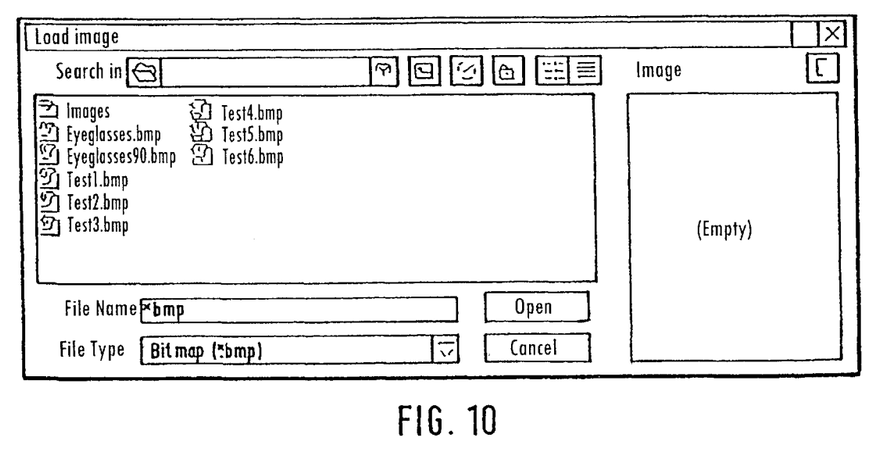

Double-clicking or selecting "Open" produces the image on the main screen as well as all measurement data.

Clicking "Save Image" button 112 saves all images recorded by the camera.

Images may be saved with or without measurement data, regardless of whether they are saved before or after eye measurement.

Saving can also be performed after measurement by clicking "OK."

Selecting "Camera On or Freeze Image" button 113 turns the camera on. The client's face is now displayed on the screen. Depending on the position, mirror 22 must be moved up or down until the face is situated at the center of the screen. Pressing the button again freezes the image and measurement can proceed.

Button 114, "Brightness, Contrast and Color Saturation," allows the brightness, contrast and color to be adjusted.

This feature allows the image quality to be enhanced in case of unfavorable lighting conditions. Normally, this is not required however.

Clicking "Raise Mirror" button 115 allows the mirror to be raised.

38 Clicking "Lower Mirror" button 116 new allows the mirror to be moved down.

Button 117 is intended for manually positioning the crosshair. If there are problems with automatic centering, the measurement hatch mark may be positioned manually after selecting button 117. For the next measurement point, the system again reverts to automatic centering.

When "Back" button 118 is clicked, the computer returns to the beginning of the measurement procedure. All data obtained since the measurement was begun are lost.

Clicking "Print" button 119 prints the image and measurement data if the system is connected to a printer.

Button 120, "Enter Distance Between Calibration Points," is only used when a new superposable frame 50 is employed and when the device is first started up. It allows the distance between calibration points to be entered.

Clicking button 121, "Brightness Threshold for Automatic Centering," changes the response threshold if problems occur with automatic centering due to unfavorable lighting conditions. This function is normally not required.

Clicking "Select Lens Table" button 122 allows the lens table of a given manufacturer to be selected. Double--clicking the name of the manufacturer or entering the name causes the lens table to be accepted. "Select Lens Table" allows the lens table to be accepted.

Selecting button 123 displays the terms of the copyright.

Selecting. "Exit Program" button 124 closes the program.

Before turning the system off, the computer must be properly shut down.

A fundamental advantage of the device according to the invention is the fact that the use of mirror 22 doubles the distance, thereby allowing a distance of 6 meters to be obtained even in confined spaces so that a nearly parallel orientation of the axes of the eyes is achieved.

Since the viewing axis of the client is aimed precisely in the center of mirror 22 surrounded by ring illuminator 24, the image of the ring illuminator obtained is in the form of a bright spot on the cornea of the eyes. Based on these reflection points, pinpoint measurement accuracy with virtually unsurpassed precision, of the reflection points and of the distance between them may, be obtained on the computer screen.

Superposable frame 50 includes a support 52 on which retaining means 54 provided with spring-loaded arms 55, 56 are located between stops 58 which are slidable and securable using screws 59, the support being connected by link 53 and screw 57 with projection 70 of sighting device 66, the light-emitting diode of which is located in a cavity 75 of the translucent cylinder 74 and connected via its connecting wires 77 and 78 to one pole of the battery 84 or the pin 81 of the switch 80, the second pin 82 being applied to the other pole of the battery, wherein the one spring lock washer 86 producing an axial spring load, which is supported on one side by clamping ring 85, presses components 72, 80, 84, and 74 axially together and in front of collar 69 of hollow cylinder 68.

| Result | | | | |
|---|---|---|---|---|
| RD right | 32.3 | RD left | 30.6 | Lens Multigressiv Perfolit |
| Height right | 32.5 | Height left | 34.8 | Type G Diameter 60 |

What is claimed is:

1. A device for determining eyeglass lens centering data when a client takes a position in front of a mirror with an already-selected eyeglass frame comprising:

a housing which is height-adjustable by means of a lift column, the housing supporting a digital video camera in which the objective lens together with a mirror and a light source is located in the region of the front panel of the housing and including a digital computer connected to the digital video camera, and a superposable frame mountable on the eyeglass frame, the superposable frame including a sighting device with a scale from which the tilting of the eyeglasses is readable, the computer monitoring a head position of the client and tilting of the eyeglasses which is displayed on a monitor screen, the superposable frame has calibration points at a predetermined spacing which matches an average distance between the eyes, and the computer sequentially determines a position of the calibration points on the monitor screen after freezing an image of the client by controlling the individual calibration points by causing an enclosure to appear box automatically on the screen, which box determines a brightness center point of the calibration points, a position of two reflection points of a light source on a cornea of the client imaged on the monitor screen with the enclosure, and determine a position of the two reflection points of the light source on the cornea imaged on the monitor screen using the enclosure.

2. A device according to claim 1, wherein:
the light source is a ring illuminator which surrounds an edge of the mirror which is one of a circular mirror, or two illuminators located on each side of the mirror edge, approximately at one of a level of the objective lens of the video camera, or approximately at a level above an upper edge of the objective lens of the video camera.

3. A device according to claim 2, wherein:
the sighting device of the superposable frame includes an on-off-switchable locating illuminator, in a form of a light-emitting diode, as well as a diffusing screen with a scale in front of which a bead of the sighting device is located at a predetermined distance, wherein a shadow on a scale of the sighting device is created when the bead is illuminated by the light source, the shadow being employed to read a tilt angle of the eyeglasses, and is emphasized as a reference line, and wherein an additional horizontal scale lines are displayed above and below the reference line each representing a change in the eyeglass tilt angle.

4. A device according to claim 3, wherein:
a plurality of pixels on the monitor screen are selected when determining a brightness of the center point of the calibration points for the superposable frame and/or of the reflection points of the light source on the cornea using the enclosure, only those pixels of the enclosure being selected to determine a brightness center point for which the brightness lies above an externally selectable threshold, and the evaluation proceeding using weighted averaging in which a first sum is obtained from a brightness of selected pixels multiplied by an X-coordinate, a second sum from the brightness of the selected pixels multiplied by a Y-coordinate, and a third sum from the brightness of selected pixels, the X-coordinate of the brightness center point resulting from division of the first sum by the third sum, and the Y-coordinate of the brightness center point resulting from division of the second sum by the third sum.

5. A device according to claim 2, wherein:
a plurality of pixels on the monitor screen are selected when determining a brightness of the center point of the calibration points for the superposable frame and/or of the reflection points of the light source on the cornea using the enclosure, only those pixels of the enclosure being selected to determine a brightness center point for which the brightness lies above an externally selectable threshold, and the evaluation proceeding using weighted averaging in which a first sum is obtained from a brightness of selected pixels multiplied by an X-coordinate, a second sum from the brightness of the selected pixels multiplied by a Y-coordinate, and a third sum from the brightness of selected pixels, the X-coordinate of the brightness center point resulting from division of the first sum by the third sum, and the Y-coordinate of the brightness center point resulting from division of the second sum by the third sum.

6. A device according to claim 1, wherein:
the sighting device of the superposable frame includes an on-off-switchable locating illuminator, in a form of a light-emitting diode, as well as a diffusing screen with a scale in front of which a bead of the sighting device is located at a predetermined distance, wherein a shadow on a scale of the sighting device is created when the bead is illuminated by the light source, the shadow being employed to read a tilt angle of the eyeglasses, and is emphasized as a reference line, and wherein an additional horizontal scale lines are displayed above and below the reference line each representing a change in the eyeglass tilt angle.

7. A device according to claim 6, wherein:
a plurality of pixels on the monitor screen are selected when determining a brightness of the center point of the calibration points for the superposable frame and/or of the reflection points of the light source on the cornea using the enclosure, only those pixels of the enclosure being selected to determine a brightness center point for which the brightness lies above an externally selectable threshold, and the evaluation proceeding using weighted averaging in which a first sum is obtained from a brightness of selected pixels multiplied by an X-coordinate, a second sum from the brightness of the selected pixels multiplied by a Y-coordinate, and a third sum from the brightness of selected pixels, the X-coordinate of the brightness center point resulting from division of the first sum by the third sum, and the Y-coordinate of the brightness center point resulting from division of the second sum by the third sum.

8. A device according to claim 1, wherein:
a plurality of pixels on the monitor screen are selected when determining a brightness of the center point of the calibration points for the superposable frame and/or of the reflection points of the light source on the cornea using the enclosure, only those pixels of the enclosure being selected to determine a brightness center point for which the brightness lies above an externally selectable threshold, and the evaluation proceeding using weighted averaging in which a first sum is obtained from a brightness of selected pixels multiplied by an X-coordinate, a second sum from the brightness of the selected pixels multiplied by a Y-coordinate, and a third sum from the brightness of selected pixels, the X-coordinate of the brightness center point resulting from division of the first sum by the third sum, and the Y-coordinate of the brightness center point resulting from division of the second sum by the third sum.

* * * * *